United States Patent [19]

Stelte et al.

[11] 4,293,738

[45] Oct. 6, 1981

[54] ANALOG ACCESS ARRANGEMENT FOR A DIGITAL TELEPHONE OFFICE

[75] Inventors: David J. Stelte, Lombard; Alex W. Kobylar, Chicago, both of Ill.

[73] Assignee: GTE Automatic Electric Labs Inc., Northlake, Ill.

[21] Appl. No.: 92,877

[22] Filed: Nov. 9, 1979

[51] Int. Cl.³ .......................... H04M 3/42; H04Q 3/60
[52] U.S. Cl. .............................. 179/18 FC; 179/18 B
[58] Field of Search ............. 179/18 FC, 27 A, 27 B, 179/18 B, 18 BG, 18 BD

[56] References Cited
U.S. PATENT DOCUMENTS 3,714,378 1/1973 Kimura et al. .................. 179/18 B Primary Examiner—Thomas A. Robinson
Attorney, Agent, or Firm—Robert J. Black; Gregory G. Hendricks

[57] ABSTRACT

Common digital line circuits are used in a digital telephone office to provide supervisory and digital conversion functions for any subscriber station connected to a digital telephone office. Subscriber stations are connected to specialized analog line circuitry via an analog access network when required.

9 Claims, 2 Drawing Figures

ANALOG ACCESS ARRANGEMENT FOR A DIGITAL TELEPHONE OFFICE

BACKGROUND OF THE INVENTION

1. Field of the Invention

The present invention relates to digital telephone offices and more particularly to an arrangement using standardized line circuits in such telephone offices. The specialized analog circuitry portion is separated from the various line circuits and connected to an analog access network which provides concentration and access to subscriber stations.

2. Description of the Prior Art

Line circuits for digital telephone offices are of a hybrid nature in that they use analog circuitry for interfacing to the various subscriber stations and they use Pulse Code Modulation (PCM) circuitry for interfacing to the digital network of the digital telephone office. These line circuits are complex and expensive, and numerous varieties of them are required to operate with the numerous types of subscriber equipment, such as party lines, coin telephones, etc. Every line circuit requires loop status circuitry, and PCM processing circuitry, but coin detection circuitry, and party line circuitry need not be dedicated to each line circuit. Therefore, by separating the analog line circuitry from the various line circuits, a standardized line circuit can be used for all subscriber stations and the complex and expensive specialized analog line circuitry can be concentrated and provided access to the subscriber stations via an analog network.

Accordingly, it is the object of the present invention to provide a novel arrangement for separating specialized analog line circuitry from line circuits used in digital telephone offices, so that a standardized digital line circuit can be used for all subscriber stations.

SUMMARY OF THE INVENTION

The present invention provides an arrangement for using a common digital line circuit for all subscriber stations by separating the specialized analog line circuitry from the line circuits used in digital telephone offices. Through use of an analog network, this arrangement also provides concentration of the specialized analog line circuitry and access of such circuitry to all subscriber stations.

The concentration arrangement includes an analog network connected between a plurality of line access circuits and a plurality of specialized analog circuits. The analog network and specialized analog circuits are further connected to a processing unit.

When a subscriber station requires service, the processing unit detects this condition via the common digital line circuit and, if required, connects one of the specialized analog circuits to the analog network which then connects it to the line requesting service via a line access circuit. Upon termination of the need for such specialized analog circuitry the processing unit disconnects it from the analog network and the line requesting service is connected to the digital network which provides the transmission and signaling functions under control of the processing unit.

The present invention thus allows the use of a standard digital line circuit for all subscriber stations and provides for concentration of specialized analog line circuitry through use of an analog network connected between the specialized analog circuitry and the line access circuits.

DESCRIPTION OF THE PREFERRED EMBODIMENT

Figure 1:
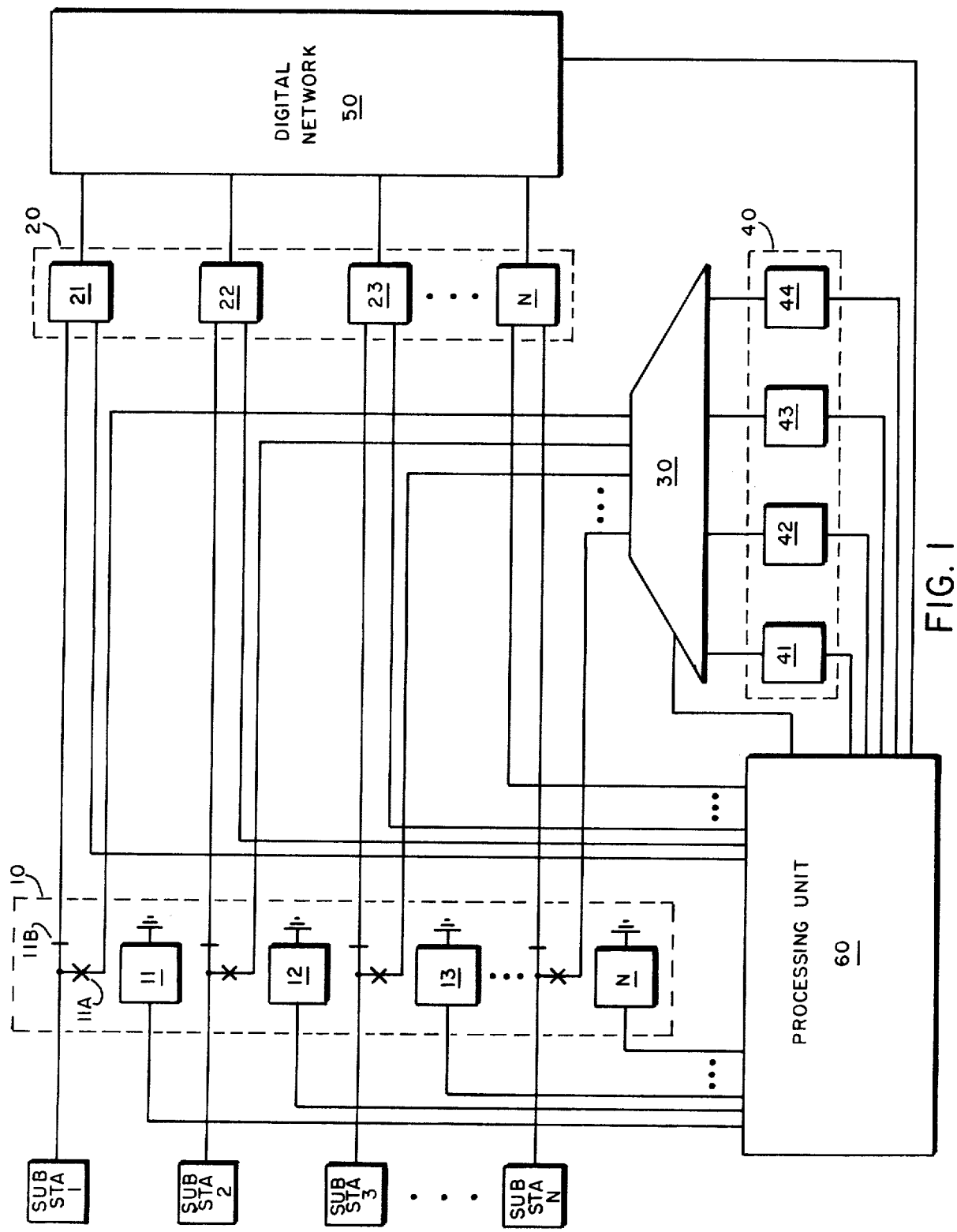
FIG. 1 of the accompanying drawing is a block diagram of an analog access arrangement for a digital telephone office, in accordance with the present invention.
Figure 2:
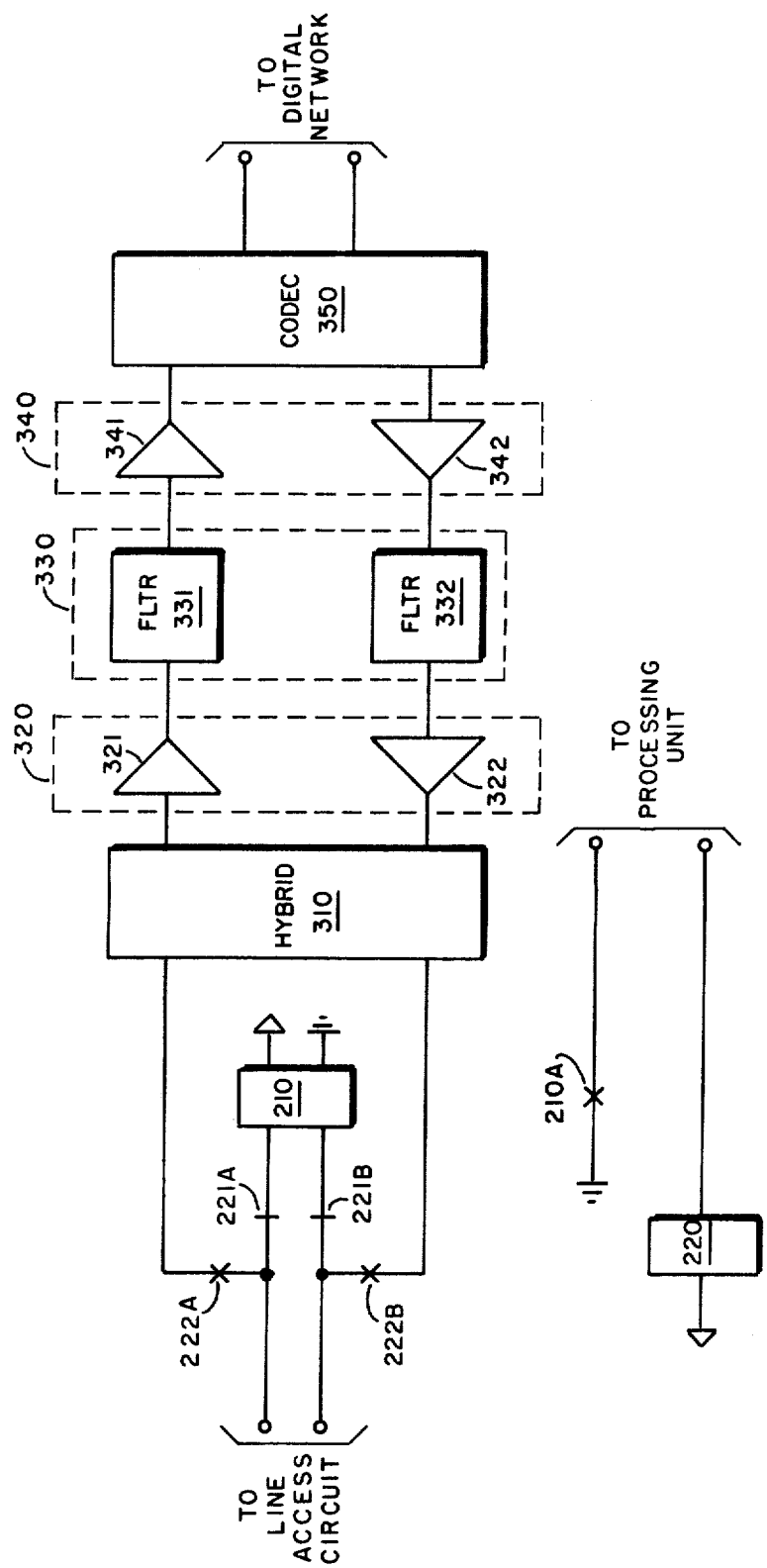
FIG. 2 is a circuit diagram of a digital line circuit in accordance with the present invention.

Referring now to FIG. 1, the analog access arrangement of the present invention is shown connected to a plurality of subscriber stations. Digital line circuits 20 are shown connected to associated subscriber stations via line access circuits 10. Digital line circuits 20 are also connected to digital network 50 and processing unit 60. Specialized analog circuits 40 are connected to analog network 30 and to processing unit 60. Analog network 30 is further connected to line access circuits 10 and processing unit 60. Digital networks are well known such as that used in Automatic Electric's No. 3 EAX, and analog networks and specialized analog line circuitry are also well known, such as that used in Automatic Electric's No. 2 EAX. A digital line circuit as used in the present invention is shown in FIG. 2.

When subscriber station 1 goes off hook, associated digital line circuit 21 detects this condition and signals processing unit 60. Upon determination of the class of service associated with an "off-hook" subscriber station, processing unit 60 connects the appropriate specialized analog circuit (coin circuit 41, or party line circuit 42), to analog network 30. Processing unit 60 also operates line access relay 11 thus also connecting subscriber station 1 to analog network 30. Under control of processing unit 60, analog network 30 then connects subscriber station 1 to the connected specialized analog circuit. Upon determination that the connected specialized analog circuit is no longer required processing unit 60 will disconnect it from analog network 30 and release the line access relay, thereby connecting the subscriber station to digital line circuit 21.

Digital line circuit 21 converts the analog signals from the "off-hook" subscriber station to digital signals to be processed by digital network 50. Processing unit 60 analyzes these signals to determine the called party to be connected to the off-hook subscriber station and will then provide a connection to the digital line circuit of the called party in digital network 50.

The other specialized analog circuits, ringing generator 43, and line testing circuit 44, are similarly connected to analog network 30. Ringing generator 43 is connected to the line access circuit of the called party via analog network 30 and line testing circuit 44 is connected to an idle line circuit via analog network 30. Additional specialized analog circuits, such as howler circuits, could further be connected to analog network 30.

Thus specialized analog line circuitry is removed from the associated specialized line circuits resulting in a standardized, minimum component digital line circuit. Consequently the required number of specialized analog circuits can be minimized since they are connected to subscriber stations when needed via analog network 30.

Referring now to FIG. 2, the digital line circuit of the present invention is shown connected between a line access circuit and a digital network. Supervisory relay 210 operates in response to completion of the loop through the subscriber station when its handset is taken "off-hook". Supervisory relay 210 transmits this "off-hook" status of the subscriber station to processing unit 60 via contacts 210A. When processing unit 60 determines that a subscriber station is to be connected to the digital network it operates relay 220. The hybrid circuit, amplifiers, filters, gating circuits and codec are all old and well known circuits for converting analog signals into PCM signals. Hybrid 310 operates to convert the two-wire signaling method used in the subscriber station to the four-wire signaling method used in the digital network. Amplifier 321 and filter 331 operate to present signals of sufficient magnitude and resolution to gate 341 to allow it to convert analog signals into Pulse Amplitude Modulated (PAM) signals, i.e. gate 341 generates periodic signals representative of the amplitude of the incoming analog signal. Codec 350 converts each PAM signal into a Pulse Code Modulation (PCM) signal by generating a binary coded signal representative of each PAM signal that it receives. Codec 350, gate 342, filter 332 and amplifier 322 operate similarly to perform the reverse function, i.e., convert the PCM signals used in the digital network to the analog signals used in the subscriber station.

The analog access arrangement of the present invention allows the use of a standardized digital line circuit for all subscriber stations. It also allows for minimization of specialized analog circuitry such as party line and coin detection circuits which are concentrated by an analog network. This analog network then connects the specialized analog circuits to subscriber stations only when they require service.

It will be obvious to those skilled in the art that numerous modifications of the present invention can be made without departing from the spirit of the invention which shall be limited only by the scope of the claims appended hereto.

What is claimed is:

1. An arrangement for concentrating specialized analog line circuitry in a digital switching system, including a plurality of subscriber stations each operated to generate an off-hook signal, said arrangement comprising:
   a plurality of line circuits, each connected to an associated one of said subscriber stations, each operated in response to a said off-hook signal to generate a supervisory signal;
   a processing unit connected to said plurality of line circuits, operated in response to predetermined ones of said supervisory signals to generate an associated line access signal and an associated analog circuit enable signal;
   connection means connected to said plurality of line circuits;
   a plurality of specialized analog circuits connected to said processing unit, each operated in response to an associated one of said analog circuit enable signals to connect to said connection means;
   each of said plurality of line circuits further operated in response to an associated one of said line access signals to connect to said connection means; and
   said connection means operated in response to connection of said line circuit and said specialized analog circuit to connect said line circuit to said specialized analog circuit.

2. The circuit of claim 1, wherein: said line circuit comprises: a line access relay operated in response to said line access signal.

3. The circuit of claim 1, wherein said line circuit further comprises: a supervisory relay operated in response to said off-hook signal to generate said supervisory signal.

4. The circuit of claim 1, wherein: said plurality of subscriber stations are further operated to generate subscriber signals, said line circuit further comprising:
   pulse code modulation means operated in response to said subscriber signals to generate pulse code modulated signals.

5. The circuit of claim 1, wherein said processing unit is further operated to generate a ringing control signal, said specialized analog circuitry comprising:
   ringing means operated in response to said ringing control signal to connect to said connection means.

6. The circuit of claim 1, wherein said processing unit is further operated to generate a party line control signal, said specialized analog circuitry further comprising:
   party line detection means operated in response to said party line control signal to connect to said connection means.

7. The circuit of claim 1, wherein said processing unit is further operated to generate a coin control signal, said specialized analog circuitry further comprising:
   coin detection means operated in response to said coin control signal to connect to said connection means.

8. The circuit of claim 1, wherein said processing unit is further operated to generate a test control signal, said specialized analog circuitry further comprising:
   line testing means operated in response to said test control signal to connect to said connection means.

9. The circuit of claim 1, wherein said connection means comprise: an analog network.

* * * * *